United States Patent [19]

Goyert et al.

[11] 4,342,847

[45] Aug. 3, 1982

[54] PROCESS FOR THE PRODUCTION OF THERMOPLASTIC SYNTHETIC MATERIALS

[75] Inventors: Wilhelm Goyert, Cologne; Ernst Meisert; Wolfgang Grimm, both of Leverkusen; Alfred Eitel, Dormagen; Hans Wagner, Dormagen; Georg Niederdellmann, Dormagen; Bernd Quiring, Leverkusen, all of Fed. Rep. of Germany

[73] Assignee: Bayer Aktiengesellschaft, Leverkusen, Fed. Rep. of Germany

[21] Appl. No.: 103,001

[22] Filed: Dec. 13, 1979

[30] Foreign Application Priority Data

Dec. 16, 1978 [DE] Fed. Rep. of Germany ....... 2854409

[51] Int. Cl.$^3$ .............................................. D01F 1/02
[52] U.S. Cl. .................................... 525/66; 264/211; 525/131; 525/440; 525/452; 525/453; 525/457; 525/458
[58] Field of Search ................. 525/66, 131, 452, 457, 525/458, 440, 453

[56] References Cited

U.S. PATENT DOCUMENTS

| | | | |
|---|---|---|---|
| 3,049,505 | 8/1962 | Grabowski | 525/66 |
| 3,233,025 | 2/1966 | Frye | 525/83 |
| 3,642,964 | 2/1972 | Rausch | 264/40 |
| 3,963,679 | 6/1976 | Ulrich | 260/75 NE |
| 3,970,717 | 7/1976 | Albrecht | 525/66 |
| 4,062,620 | 12/1977 | Prirolli | 350/96 |
| 4,179,479 | 12/1979 | Carter | 525/66 |
| 4,281,946 | 4/1981 | Gogert et al. | 525/66 |

FOREIGN PATENT DOCUMENTS

| | | |
|---|---|---|
| 1964834 | 7/1971 | Fed. Rep. of Germany . |
| 2447368 | 8/1976 | Fed. Rep. of Germany . |
| 2549372 | 5/1977 | Fed. Rep. of Germany . |
| 2610980 | 5/1979 | Fed. Rep. of Germany . |
| 54-7827 | 4/1979 | Japan . |
| 1357904 | 6/1971 | United Kingdom . |
| 1513197 | 10/1976 | United Kingdom . |

*Primary Examiner*—Paul Lieberman
*Attorney, Agent, or Firm*—Gene Harsh; Joseph C. Gil; Lyndanne M. Whalen

[57] ABSTRACT

The instant invention is directed to a continuous process for the production of thermoplastic materials, comprising:

I. introducing 4 to 65 parts by weight of thermoplastic polymer into an extruder at a first inlet, wherein the temperature within said extruder is such that said thermoplastic polymer melts;

II. adding to said thermoplastic polymer through a second inlet 35 to 96 parts by weight of the following polyurethane forming components, such that the total parts by weight of thermoplastic polymer and polyurethane components is 100:

(A) organic polyisocyanate; and
(B) chain lengthening agent with a molecular weight below 400 containing a hydroxyl group and/or amine group;

wherein the ratio of isocyanate groups of component (A) to Zerewitinoff active groups of component (B) is in the range of from 0.90:1 to 1.2:1; and III. discharging from the extruder the product of the process when the reaction of said polyurethane components (A) and (B) is substantially complete.

9 Claims, No Drawings

PROCESS FOR THE PRODUCTION OF THERMOPLASTIC SYNTHETIC MATERIALS

BACKGROUND OF THE INVENTION

This invention relates to an improved process for the production of thermoplastic polymer mixtures by the reaction of starting components for the preparation of polyurethane in the presence of a previously prepared thermoplast in an extruder, preferably a self-cleaning double screw extruder.

Thermoplastic polyurethanes have been used for many years for a wide variety of applications because of their excellent physical properties. Of the various processes described in the literature for the manufacture of such thermoplasts, the most attractive is the direct production in self-cleaning double screw extruders. These apparatus effect very rapid homogenization of the reaction mixture and the screw shafts clean each other and the cylinders at every point so that the formation of even temporary accretions which could cause decomposition or crosslinking of the products due to prolonged over-heating is avoided.

The processes hitherto known require special measures to bring the reactants together (relatively high molecular weight polyol, chain lengthening agent and diisocyanate) so as to form a homogeneous mixture before polyurethane formation has set in to any significant degree. If the components are mixed too slowly, the polyurethanes obtained are inhomogeneous and contain gel particles which are impossible or difficult to dissolve or melt.

According to the teaching of U.S. Pat. No. 3,233,025, the individual reactants are first brought together in a special mixing apparatus before the homogeneous reaction melt is fed into the screw extruder.

In the process described in U.S. Pat. No. 3,642,964, the reactants must also be mixed very rapidly. To achieve this, the reaction melt is intensively homogenized in a mixing zone of a double shaft screw extruder by means of kneading elements at the latest 6 seconds after the diisocyanate and diol have been introduced. In order to obtain a uniform product, it is also necessary that the melt viscosity should remain virtually uniform over the whole length of the extruder (in the region of about 100 to 1,000 Pas).

According to the teaching in German Offenlegungsschriften 2,302,564 and 2,549,372, however, the reaction mixture must have already been intensively mixed in the extruder with the aid of kneading elements when the reaction melt is still at a low viscosity (about 20 to 70 Pas) if inhomogeneity in the end product is to be avoided.

According to a particular variation of the process disclosed in these German Offenlegungsschriften, fluxes, e.g., thermoplasts, may be added to the product in the extruder during or after the reaction. In such cases, however, the criteria with regard to the kneading zone must also be observed.

In the processes according to German Offenlegungsschriften 2,447,368 and 2,610,980, a decreasing temperature profile must be established in the reaction melt from the intake zone to the point of discharge from the extruder, so that there is little possibility of controlling the polyisocyanate polyaddition reaction. It would appear to be particularly difficult to produce a homogeneous thermoplastic polyurethane according to the teaching of German Offenlegungsschrift 2,610,980 because the starting materials must first be heated to a high temperature and then brought together. Unless the components are mixed very rapidly, a considerable proportion of the polyurethane reaction would presumably take place at a stage when localized over-concentrations of the individual reactants are still present, with the result that a non-uniform product is obtained. Moreover, the initial temperatures are so high that the polyurethane obtained is liable to be damaged by heat.

A process for the production of blends of various thermoplasts in which at least one component is a thermoplastic polyurethane, in extruders, preferably in multishaft screw extruders and most preferably in self-cleaning double shaft screw extruders, has now surprisingly been found, in which the various means mentioned above for achieving rapid mixing of the reaction melt are not required. When carrying out the process according to the invention, there is no need to provide kneading blocks in any particular position of the screw shafts. Moreover, preliminary mixing of the reactants is not necessary, nor is it necessary to maintain a very narrow temperature and/or viscosity profile.

DESCRIPTION OF THE INVENTION

The present invention relates to a continuous process for the production of thermoplastic materials, comprising:

I. introducing 4 to 65, preferably 10 to 50, parts by weight of thermoplastic polymer into an extruder, preferably a multi-shaft extruder, most preferably a self-cleaning double shaft screw extruder, at a first inlet, wherein the temperature within said extruder is such that said thermoplastic polymer melts;

II. adding to said thermoplastic polymer through a second inlet, and optionally additional inlets, 35 to 96, preferably 50 to 90, parts by weight of the following polyurethane forming components, such that the total parts by weight of thermoplastic polymer and polyurethane components is 100:

(A) organic polyisocyanate;

(B) chain lengthening agent with a molecular weight below 400, preferably below 250, containing a hydroxyl group and/or amine group; and (C) as an optional ingredient, up to 80% by weight, preferably less than 50% by weight, based on the total amount of (A), (B), and (C), of substantially linear polyols having molecular weights in the range of from 400 to 10,000, preferably from 450 to 6,000;

wherein the ratio of isocyanate groups of component (A) to Zerewitinoff active groups of components (B) and (C) is in the range of from 0.90:1 to 1.2:1, preferably from 0.95:1 to 1.10:1; and III. discharging from the extruder the product of the process when the reaction of said polyurethane components (A), (B) and (C) is substantially complete.

The substantially linear polyols with molecular weights ranging from 400 to 10,000, preferably from 450 to 6,000 which may be used according to the invention include virtually all known polyesters, polylactones, polyethers, polythioethers, polyester amides, polycarbonates, polyacetals and vinylpolymers. It is preferred that they have two Zerewitinoff active groups (principally hydroxyl groups), although minor quantities of such compounds containing three Zerewitinoff active groups may also be included. Examples of such polyols include polybutadiene diols, polyhydroxyl compounds already containing urethane or urea groups, modified or unmodified natural polyols, and compounds containing other Zerewitinoff active groups, such as amine, carboxyl or thiol groups. These compounds are known in the art and have been fully described, e.g. in German Offenlegungsschriften 2,302,564; 2,423,764 and 2,549,372 (U.S. Pat. No. 3,963,679) and 2,402,840 (U.S. Pat. No. 3,984,607) and in German Auslegeschrift 2,457,387 (U.S. Pat. No. 4,035,213). In the process according to the invention, it is preferred to use hydroxyl-containing polyesters of glycols and adipic acid, phthalic acid and/or terephthalic acid and their hydrogenation products, hydroxyl polycarbonates, polycaprolactones, polyethylene oxide, polypropylene oxide, polytetrahydrofuran and mixed polymers of ethylene oxide and propylene oxide.

Diisocyanates to be used according to the invention include the aliphatic, cycloaliphatic, aromatic, araliphatic and heterocyclic diisocyanates known in the art such as those described, e.g. in German Offenlegungsschriften 2,302,564; 2,423,764; 2,549,372; 2,402,840 and 2,457,387. Diisocyanates which are preferred according to the invention include substituted and unsubstituted hexamethylene diisocyanate; isophorone diisocyanate; lysine ester diisocyanates; the various tolylene, diphenyl methane and xylylene diisocyanates; and their hydrogenation products, the naphthalene-1,5-diisocyanate.

The above-mentioned diisocyanates may, if desired, be used together with up to 15 mol %, based on the diisocyanate, of a higher functional polyisocyanate but the quantity of higher functional polyisocyanate must be limited so that the product leaving the screw extruder is still fusible or thermoplastic. A relatively large quantity of higher functional isocyanates must generally be compensated by the addition of hydroxyl or amino compounds which have an average functionality of less than two, or also monoisocyanates in order to avoid excessive chemical crosslinking of the product leaving the screw extruder. On the other hand, the reaction may be carried out in such a manner that chemical crosslinking of the elastomer takes place subsequently during storage (for example, by using an excess of compounds containing isocyanate groups). Examples of higher functional isocyanates and monofunctional compounds may also be found in the publications mentioned above. Examples include mono amines such as butylamine, dibutylamine, octylamine, stearylamine, N-methyl stearylamine, pyrrolidine, piperidine, cyclo-hexylamine and monohydric alcohols. Examples of monohydric alcohols include butanol, 1-ethyl hexanol, octanol, dodecanol, amyl alcohols, cyclo-hexanol and ethylene glycol monoethyl ether.

Any chain lengthening agents may be used according to the invention including those known and described e.g. in German Offenlegungsschriften 2,302,564; 2,423,764; 2,549,372; 2,402,799; 2,402,840 and 2,457,387. These include low molecular polyhydric alcohols (preferably glycols), polyamines, hydrazines and hydrazides. Amino alcohols such as ethanolamine, diethanolamine, N-methyldiethanolamine, triethanolamine and 3-aminopropanol may also be used according to the invention. Preferred chain lengthening agents include ethylene glycol; di- and triethylene glycol; 1,2-propane diol; 1,3- and 1,4-butane diol; 1,6-hexane diol; 2-ethyl hexane diol(1,3); 2,2-dimethyl propane diol; 1,4-bis-hydroxy methyl cyclohexane and hydroquinone dihydroxy ethyl ether. The following are particularly preferred: ethylene glycol, diethylene glycol, 1,4-butane diol and 1,6-hexane diol.

The above-mentioned polyurethane forming components (A) to (C) may be introduced into the extruder at one or more points and the components may be introduced either separately or as premixtures. It is particularly recommended, especially when using amino functional chain lengthening agents, to first prepare a reaction product of the polyisocyanate and the relatively high molecular weight polyhydroxyl compound. The isocyanate component (A) used in this case is thus a relatively high molecular weight prepolymer containing isocyanate groups.

A wide variety of previously prepared thermoplastic polymers may be used in the process according to the invention, for example thermoplastic polyurethanes, which have been prepared by the processes represented, e.g. by German Auslegeschriften 1,106,959 and 1,157,772, British Pat. No. 1,057,018 and the German Offenlegungsschriften 2,302,564 and 2,474,764, referred to above.

The known ABS graft copolymer are also suitable thermoplastic polymers according to the invention. These are elastic-thermoplastic products synthesized mainly from the monomers, acrylonitrile (A), butadiene (B) and styrene or α-methyl styrene (S). The butadiene component may be partly or completely replaced by another rubber component, e.g. an EPDM (Ethylene-Propylene-Diene-Monomer-") rubber, to produce a so-called AES polymer.

These polymers are prepared by known processes of emulsion, suspension, solvent-free or solution polymerization or combinations of these processes, e.g. as described by C. H. Basdekis in "ABS Plastics", Reinhold Publishing Corporation, New York, 1964.

Other thermoplasts suitable for the purpose of the invention include polyethylene and polypropylene (but polymers of this type should only be used in quantities of at the most 10% by weight, based on the total quantity of end product). Other thermoplasts include copolymers of ethylene and other olefinically unsaturated monomers, polybutene-(1), polymethyl pentene, polystyrene (in particular impact resistant polystyrene), PVC, polymethacrylic acid methyl esters, polyamides, aromatic polyethers (e.g. polyphenylene oxide), polyesters or terephthalic acid and optionally isophthalic acid and butylene glycol and/or ethylene glycol, polybutylene glycol terephthalate containing polyether soft segments, cellulose esters (e.g. cellulose acetate, propionate and acetobutyrate), styrene-butadiene (graft) copolymers (which may be mixed with other polymers) and polypropylene and ethylene-propylene copolymers mixed with EPM and/or EPDM rubbers. Polymers of this type have been described, for example, by Vieweg et al in "Kunststoff Handbuch", Volumes II, IV-VII, IX and XI, publishers Carl Hanser Verlag, Munich, 1963-1971, and by Hansjürgen Saechtling in "Kunststoffaschenbuch", 20th Edition, Carl Hanser Verlag, Munich-Vienna, 1977.

The preferred ABS polymers used according to the invention include mixtures of (a) 5 to 70% by weight of one or more graft products and (b) 95 to 30% by weight of one or more thermoplastic resins.

The graft products (a) are preferably polymers obtained by the polymerization of graft monomers in the presence of a rubber used as the graft basis (polymer backbone). The proportion of rubber used for these products is about 5 to 80%, by weight, and is partly determined by the polymerization process employed.

The substances suitable for use as polymer backbone include in particular polybutadiene polymers, butadiene/acrylonitrile polymers and butadiene/styrene polymers and butadiene/styrene block polymers. The graft monomers used are mainly styrene, mixture of styrene and acrylonitrile (preferably in proportions by weight ranging from 90:10 to 50:50), mixtures of styrene and methyl methacrylate (preferably in proportions by weight ranging from 5:95 to 95:5) and mixtures of styrene, acrylonitrile and methyl methacrylate.

The thermoplastic resin (b) which is the second component of the ABS polymers constitutes the continuous phase (matrix) and may be, for example, a polymer or copolymer or styrene, α-methyl styrene, acrylonitrile, methyl methacrylate and maleic acid anhydride.

Polystyrene, styrene/acrylonitrile polymers containing from 20 to 35% by weight of acrylonitrile, and α-methylstyrene/acrylonitrile copolymers containing from 20 to 31% by weight of acrylonitrile are preferred. The average molecular weight of these resins is in most cases from 50,000 to 550,000. The molecular non-uniformity expressed by the term $(M_w/M_n)-1=U_n$ is 1.0–3.5. According to the invention, however, component (a) may be used as the only thermoplast if desired.

The thermoplastic polycarbonates which may be used according to the invention include the polycondensates prepared by the reaction of dihydroxy diaryl alkanes with phosgene or diesters of carbonic acid. Apart from unsubstituted dihydroxy diaryl alkanes, there may also be used those in which the aryl groups in the ortho and/or meta position to the hydroxyl group carry methyl groups or halogen atoms. Branched chain polycarbonates are also suitable. These polycarbonates generally have average molecular weights of from 10,000 to 100,000, preferably from 20,000 to 40,000.

The following are examples of suitable aromatic dihydroxy compounds: hydroquinone; resorcinol; 4,4'-dihydroxy diphenyl; bis-(hydroxy phenyl)-alkanes, such as $C_1$–$C_8$-alkylene-bis-phenols and $C_2C_8$-alkylidene-bis-phenols; bis-(hydroxy phenyl)-cycloalkanes, such as $C_5$–$C_{15}$-cycloalkylene- and $C_5$–$C_{15}$-cycloalkylidene-bis-phenols; bis-(hydroxy phenyl)-sulfides, -ethers, -ketones, -sulfoxides and -sulfones; also α,α-bis-(hydroxy phenyl)-diisopropyl benzene and the corresponding compounds which are alkylated or halogenated in the nucleus. The following are preferred: polycarbonates based on bis-(4-hydroxy phenyl)-propane-(2,2) (bisphenol A); bis-(4-hydroxy-3,5-dichlorophenyl)-propane-(2,2) (tetrachloro bisphenol A); bis-(4-hydroxy-3,5-dibromo phenyl-propane-(2,2) (tetrabromo bisphenol A); bis-(4-hydroxy-3,5-dimethylphenyl)-propane-(2,2) (tetramethyl bisphenol A); bis-(4-hydroxy phenyl)-cyclohexane-(1,1) (bisphenol Z) and compounds based on tri-nuclear bis-phenols, such as α,α-bis-(4-hydroxy phenyl)-p-diisopropyl benzene.

Other bis-phenols suitable for the preparation of polycarbonates have been described in U.S. Pat. Nos. 3,028,365; 2,999,835; 3,148,172; 3,271,368; 2,970,137; 2,991,273; 3,271,367; 3,280,078; 3,014,891 and 2,999,846.

The thermoplasts used according to the invention are preferably polycarbonates, ABS and EPDM polymers and copolymers being particularly preferred.

When thermoplastic polycarbonates are used, they are preferably used in quantities of from 25 to 60% by weight, most preferably from 30 to 50% by weight, based on the total weight of the product of the process. Thermoplastic ABS is preferably used in a quantity from 4 to 30% by weight, most preferably from 10 to 20% by weight, based on the whole product of the process.

The process according to the invention is carried out as follows.

The thermoplastic polymer is fed into the intake zone of a screw extruder. The temperature of the housing is adjusted so that the thermoplast melts. The components which form the polyurethane are then added to the molten thermoplast by introduction through a second feed point, either separately or as a preliminary mixture. The components which form the polyurethane may, of course, be introduced into the extruder in several portions at two or more points.

The process according to the invention may also be carried out in the presence of lubricants, stabilizers, catalysts, inorganic and organic fillers, pigments and dyes, plasticizers, inert organic solvents and the like. Examples are described in the above-mentioned references.

Suitable lubricants include, for example, polyolefins, polyalkylene oxides, polyalkylene esters, polyalkylene amides and similar waxes. Lubricants are recommended particularly in the case of soft products. Catalysts are generally added in quantities of from 1 ppm to 1,000 ppm. Suitable catalysts include, for example, the known salts of alkali metal and alkaline earth metals; organic metal compounds such as zinc octoate, tin octoate, dibutyl tin dilaurate, iron acetyl acetonate and titanium tetrabutylate; and tertiary amines such as triethylamine, N-methylmorpholine, diazabicyclo octane and N,N'-dimethyl benzylamine. Other examples of catalysts suitable for the process and details concerning the activity of the catalysts are given in Kunststoff Handbuch, Volume III, published by Vieweg and Höchtlen, Carl Hanser Verlag, Munich 1966, on pages 96 to 102.

As already mentioned above, the process is preferably carried out in multi-shaft screw extruders, especially those with self-cleaning screws.

If desired, however, the reaction may be carried out only partly in a multi-shaft, preferably a double shaft screw extruder, and the reaction mixture may then be left to react in a following single shaft extruder.

Suitable screw extruders have been described, for example, in German Pat. Nos. 813,154; 862,668; 940,109; German Offenlegungsschrift 2,302,564 (U.S. Pat. No. 3,963,679) and U.S. Pat. Nos. 3,233,025 and 3,642,964.

The residence times of the molten reaction mixtures in the screw extruder are generally in the range of from 0.3 to 30 minutes, preferably from 0.5 to 4 minutes. The temperature in the screw housing is in the region of about 60° to 300° C. (in the intake zone: about 80° to 280° C. but above the melting point of the thermoplast; in the middle of the extruder; about 100° to 300° C.; in the discharge zone: about 60° to 250° C.). The melt leaving the extruder is chilled and size reduced by known methods. The products of the process may be worked up thermoplastically or in solution by the usual processes to form films, gear wheels, cable sheaths, seals, and the like.

The examples which follow explain the process according to the invention. Quantities given are parts by weight or percentages by weight unless otherwise indicated. A double shaft kneader-and-extruder of the type ZSK 53 V of Werner & Pfleiderer, Stuttgart, with self-cleaning shafts is used in all of the examples. The length of the part in which the process takes place is approximately 42 times the diameter of the shaft which amounts to 53 mm. The same shaft equipment, with kneading elements occupying about 20% of the shaft, is used in all of the examples. The kneading elements are arranged in 3 kneading zones being located at the end of the first, second and third part of the extruder, respectively, as described in U.S. Pat. No. 3,963,679. The screw extruder consists of 12 housings of about equal length, the first of which is equipped with a feed hopper for the thermoplasts. The function and mode of operation of the screw extruder and of kneading and conveyor elements of the shaft equipment, etc. have been fully described in trade cataloques by Werner & Pfleiderer, and U.S. Pat. Nos. 3,963,679, 3,764,114 and 3,392,962, herein incorporated by reference.

EXAMPLES

EXAMPLE 1

The thermoplast used is a commercial emulsion ABS polymer of 17% acrylonitrile, 53% styrene and 30% butadiene.

50 parts of the granulated thermoplastic copolymer are fed into the hopper of the screw extruder. The housings of the screw extruder are adjusted to the following temperatures:
100° C. (housing 1), 150° C. (housing 3), 180° C. (housing 5), 210° C. (housing 7), 220° C. (housing 9), 100° C. (housing 11), 100° C. (housing 12) and 205° C. (head).

The following substances are injected into housing 5 of the screw extruder through a second intake point:
Experiment (a):
  10 parts of butanediol-(1,4) and 28.6 parts of 4,4'-diphenylmethane diisocyanate (NCO/OH equivalent ratio=1.03)
Experiment (b):
  25 parts of butanediol-(1,4) and 46.2 parts of hexamethylene diisocyanate (NCO/OH ratio=0.99)
Experiment (c):
  20 parts of butanediol-(1,4) and 57.2 parts of 4,4'-diphenylmethane diisocyanate; and into housing 8, 25 parts of glass fibers which have been treated with a commercial size.

The components of the reaction mixture have been made up into a preliminary mixture in each case, care being taken to ensure that the mixing pressure is above the counter pressure building up inside the machine in order to ensure clean introduction of the injection mixture.

Highly impact resistant, rigid, thermoplastic synthetic materials are obtained in all three experiments. In experiment (c), the rigidity of the thermoplast is particularly high owing to the addition of glass fibers (fiber length: 6 mm, fiber diameter: 12 $\mu$m).

EXAMPLE 2

The ABS polymer from Example 1 is used as thermoplast. The housing of the screw extruder is adjusted to the following temperatures:

| Housing: | 1 | 3 | 5 | 7 | 9 | 11 | 12 |
|---|---|---|---|---|---|---|---|
| Temperature (°C.): | 100 | 180 | 200 | 220 | 220 | 160 | 100 |
| Head temperature: | 210° C. | | | | | | |

Experiment (a):
  57.5 parts of the granulated ABS polymer are introduced into the hopper of the screw extruder. The following premixed polyurethane reaction mixture is injected into housing 5 through a feed inlet:
  100 parts of a polyester of adipic acid and diethylene glycol (molecular weight: 2,000), 30 parts of butanediol-(1,4), 1 part of stearylamide, 0.3 parts of 2,6-di-t-butyl-4-methyl phenol and 98.7 parts of diphenylmethane diisocyanate (NCO/OH ratio=1.03).

A thermoplastic chemical material having high rigidity and high impact resistance at low temperatures is obtained. The notched impact strength according to DIN 53 453 at −30° C. is 20 kJ/m$^2$. The tensile strength determined according to DIN 53 504 is 45 MPa. After 16 hours treatment with boiling methylene chloride, only 4% by weight of the ABS polymer are extracted.

Experiment (b):
  60.8 parts of the ABS polymer are introduced into the hopper of the screw extruder. 100 parts of the polyester from experiment (a) are introduced into housing 2 through another intake point. The following premixed reaction mixture is injected into housing 5:
  10 parts of butanediol-(1,4), 0.5 parts of stearylamide and 41.5 parts of diphenylmethane diisocyanate (NCO/OH ratio=1.03).

The thermoplast is similar in its properties to that obtained in experiment (a).

Experiment (c):
  38.5 parts of the granulated ABS polymer are introduced into the hopper of the screw extruder. The following reaction mixture is injected through an intake point into housing 2:

100 parts of a copolymer of adipic acid, ethylene glycol and butanediol (molecular weight: 2,000), 60 parts of butanediol-(1,4), 1 part of stearylamide, 0.5 parts of 2,2',6,6'-tetraisopropyl-diphenyl carbodiimide and 185 parts of diphenylmethane diisocyanate (NCO/OH ratio=1.03).

A thermoplastic material having great rigidity and impact strength is again obtained.

Experiment (d) (Comparison):
  The polyurethane reaction mixture used in experiment (a) is introduced into the hopper of the screw extruder. 57.5 parts of the molten ABS polymer are fed into housing 6. The method is thus similar to that of German Offenlegungsschrift 2,302,564.

The thermoplast obtained has only moderate impact strength at low temperatures, i.e. 10 kJ/m$^2$ at −30° C.; the tensile strength is 35 MPa. 12% by weight of the ABS polymer can be extracted after 16 hours treatment with boiling methylene chloride.

EXAMPLE 3

The thermoplast used is a polycarbonate based on bisphenol A, prepared by continuous phase interface polycondensation according to German Patent 971,790. Relative viscosity: 1.30 (determined on a 0.5% solution in methylene chloride).

The housing of the screw extruder was adjusted to the following temperatures:

| Housing: | 1 | 3 | 5 | 7 | 9 | 11 | 12 |
|---|---|---|---|---|---|---|---|

-continued

| Temperature (°C.): | | 100 | 250 | 270 | 250 | 230 | 190 | 190 |
|---|---|---|---|---|---|---|---|---|
| Head Temperature: | 225° C. | | | | | | | |

146 parts of the polycarbonate are introduced into the hopper of the screw extruder. The following reaction mixture is introduced into housing 2 through an intake point: 100 parts of a polyester of adipic acid and butanediol-(1,4) (molecular weight: 2,000) and 61.5 parts of diphenylmethane diisocyanate (NCO/OH ratio=1.03).

17 parts of butanediol-(1,4) are injected into housing 6 as chain lengthening agent.

A chemical material having great rigidity and high impact strength at low temperatures is again obtained.

What is claimed is:

1. A continuous process for the production of thermoplastic materials, comprising:
   I. introducing 4 to 65 parts by weight of thermoplastic polymer into an extruder at a first inlet, wherein the temperature within said extruder is such that said thermoplastic polymer melts;
   II. adding to said thermoplastic polymer through a second inlet 35 to 96 parts by weight of the following polyurethane forming components, such that the total parts by weight of thermoplastic polymer and polyurethane components is 100;
      (A) organic polyisocyanate; and
      (B) chain lengthening agent with a molecular weight below 400 containing a hydroxyl group and/or amine group;
      wherein the ratio of isocyanate groups of component (A) to Zerewitinoff active groups of component (B) is in the range of about 0.90:1 to 1.2:1; and
   III. discharging from the extruder the product of the process when the reaction of said polyurethane components (A) and (B) is substantially complete.

2. The process of claim 1, wherein said polyurethane components further comprise substantially linear polyol having a molecular weight from 400 to 10,000.

3. The process of claim 1, wherein said thermoplastic polymer is 4 to 30 parts by weight ABS polymer.

4. The process of claim 1, wherein said thermoplastic polymer is 25 to 60 parts by weight polycarbonate.

5. The process of claim 1, wherein said thermoplastic polymer is 20 to 65 parts by weight thermoplastic polyurethane.

6. The process of claim 1, wherein said polyurethane forming components are added through several inlets.

7. The process of claim 1, wherein the reaction mixture is in said extruder for 0.3 to 30 minutes and the temperature within said extruder is from about 60° to 300° C.

8. The process of claim 1, wherein said proportion of isocyanate groups of component (A) to Zerewitinoff active groups of component (B) are in the range of 0.95:1 to 1.1:1.

9. The process of claim 1, wherein said extruder is a self-cleaning double shaft screw extruder.

* * * * *